(No Model.) 4 Sheets—Sheet 2.
W. DEVOLL.
DRIVING GEAR FOR VELOCIPEDES.
No. 527,671. Patented Oct. 16, 1894.
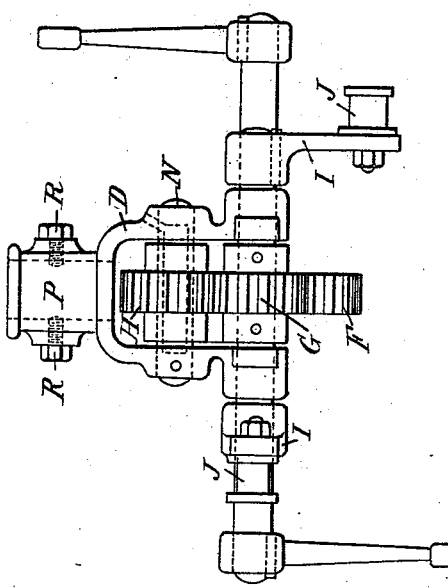
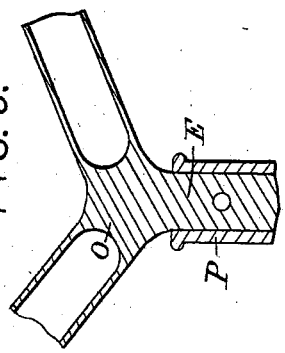
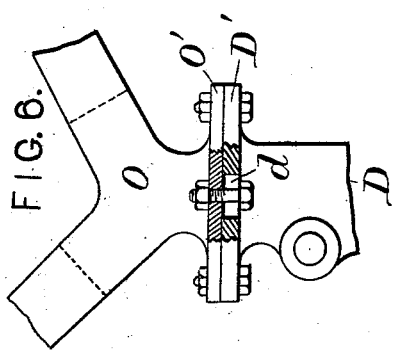
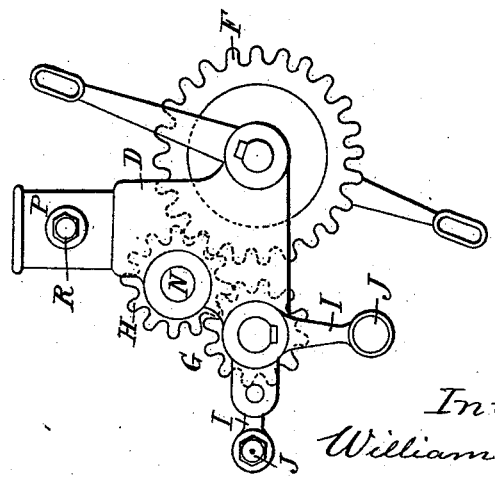
Witnesses:
Inventor:
William Devoll
By
Attorneys.

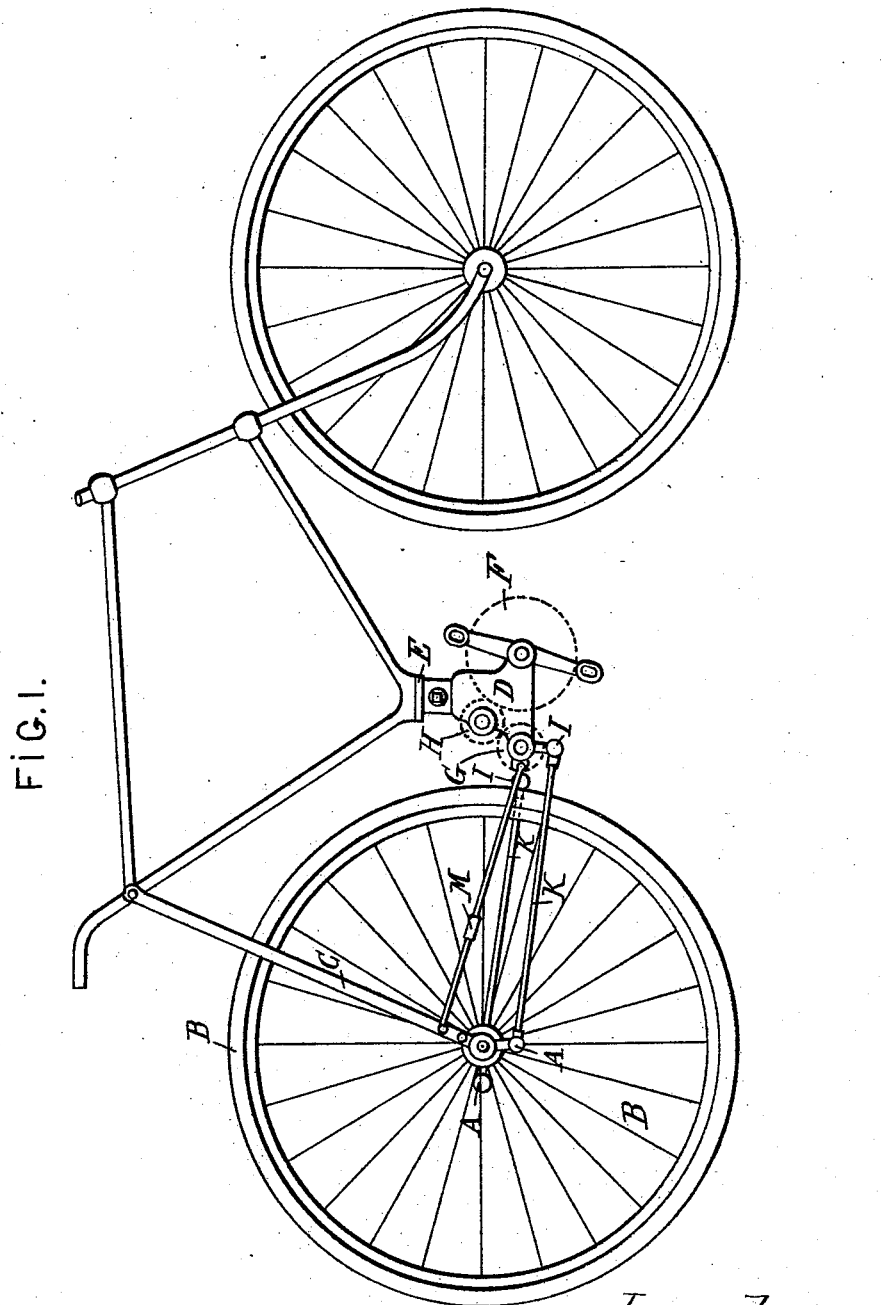

(No Model.) 4 Sheets—Sheet 3.

W. DEVOLL.
DRIVING GEAR FOR VELOCIPEDES.

No. 527,671. Patented Oct. 16, 1894.

Witnesses:
M. B. Barker
A. J. Underhill

Inventor:
William Devoll,
By Richards
Attorneys.

(No Model.) 4 Sheets—Sheet 4.
W. DEVOLL.
DRIVING GEAR FOR VELOCIPEDES.
No. 527,671. Patented Oct. 16, 1894.

Witnesses:
Inventor:
William Devoll
By
Attorneys.

UNITED STATES PATENT OFFICE.

WILLIAM DEVOLL, OF ERDINGTON, ENGLAND.

DRIVING-GEAR FOR VELOCIPEDES.

SPECIFICATION forming part of Letters Patent No. 527,671, dated October 16, 1894.

Application filed July 5, 1893. Serial No. 479,610. (No model.)

*To all whom it may concern:*

Be it known that I, WILLIAM DEVOLL, engineer, a subject of the Queen of Great Britain, residing at Cuba Villa, Chester Road, Erdington, in the county of Warwick, England, have invented certain new and useful Improvements in Driving-Gear for Velocipedes; and I do hereby declare that the following is a full, clear, and exact description of the same.

The object of my invention is to provide a suitable gear for the purpose of propelling bicycles without the use of chains and chain wheels, which are much objected to on account of the frequent stretching and slipping of the chain.

The accompanying drawings represent the arrangement and construction of a bicycle according to this invention.

Figure 7:
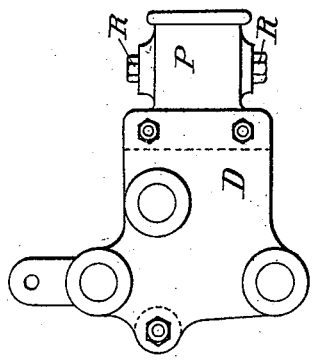
Figure 8:
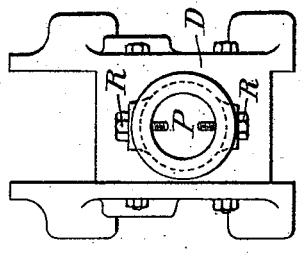
Figure 4:
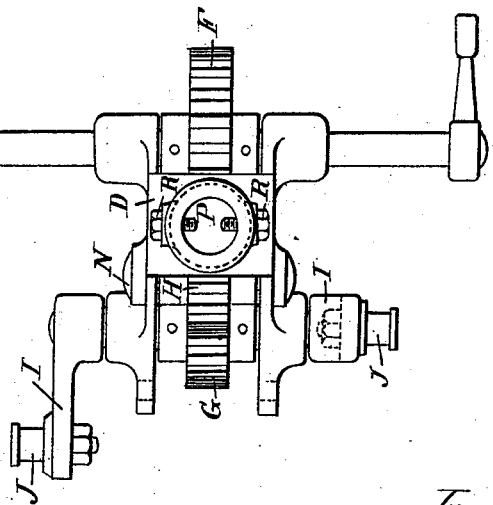
Figure 9:
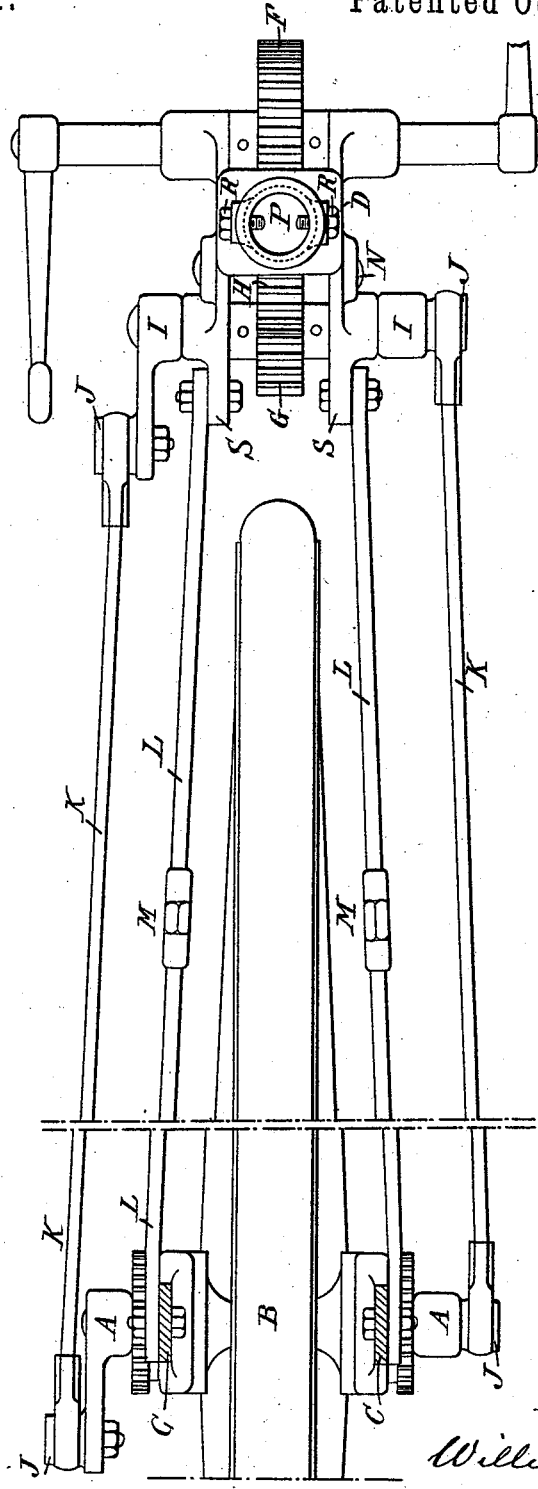

Figure 1 is a side elevation of what is known as a safety bicycle provided with my improvements. Fig. 2 is a side elevation of the bracket and driving gear with coupling rods removed. Fig. 3 is an end elevation of the same. Fig. 4 is a plan of Figs. 2 and 3. Fig. 5 is a sectional detail showing the manner of attaching the bracket to the frame by a socket connection. Fig. 6 is a front elevation showing another method of attaching bracket to the frame by a flange joint with bolts and nuts. Fig. 7 is an elevation showing how bracket may be made in two parts and bolted together. Fig. 8 is a plan of the same. Fig. 9 is a plan showing driving gear connected to rear or driving wheel.

For this purpose I fix two cranks A A on the axle of the rear wheel or driving wheel B one on each end of the axle outside of the frame or fork C C which in this case carries the axle bearings.

In a suitable bracket D which is attached to the lower part of the frame underneath the back bone in the manner shown at E in Figs. 1 and 5 or as shown at Fig. 6, I place a spur-wheel F and a pinion G in a line with each other but not in gear, and between them I place an intermediate wheel or carrier H so as to cause the pinion to revolve in the same direction as the spur wheel. The wheel F, pinion G and carrier H are placed inside the bracket D the depending sides of which form the bearings for their three spindles which pass through the bracket.

The spur wheel F and pinion G are keyed on or otherwise secured to their spindles the carrier H revolving loose on its own spindle. On the ends of the pinion spindle outside of the bracket bearings I fix two cranks I I of the same stroke as the two cranks A A on the driving wheel. The four cranks are fitted with suitable steel crank pins J J and are coupled together by two light steel coupling rods K K one on each side of the driving wheel, in the manner shown at Figs. 1 and 7. The cranks may be fixed to work at right angles to each other to overcome dead centers or otherwise.

The pedal cranks are fitted on the ends of the spur wheel spindle in the usual way. When a forward motion is given to the pedal cranks by the rider, the spur wheel which is in gear with the carrier will cause the pinion to revolve in the same direction and by means of the cranks and coupling rods which are connected to the pinion spindle the driving wheel will also be propelled forward.

The Y piece or fitting *o* Fig. 5 may be made of malleable iron or steel and brazed in the tubes forming the frame in the usual way. The shank of it should be turned, and the socket bored to fit. The bracket is then secured by tightening up the two set pins R, R.

Instead of the socket joint, if preferred, the bracket may be bolted to the frame by flanges O' and D' in the manner shown at Fig. 6, but in this case elongated bolt holes or slots *d* should be formed in one of the flanges. The bracket can then be instantly adjusted until the crank axle of the bracket is parallel with the axle of the driving wheel and is then secured by tightening up the bolts, and the bracket which has a socket connection may also be readily adjusted and then secured by the set pins.

The advantage of a simple and ready means of adjusting the bracket is obvious to competent persons as the smooth and easy working of the cranks and coupling rods depends on the crank axles being dead parallel.

For facility in molding the bracket may be made in two parts if preferred and bolted together in the manner shown at Figs. 7 and 8.

With a bracket as described and shown any proportion of gear wheels may be used the proportion shown in the accompanying drawings being as two of the pinion to one of the spur wheel, the rear wheel or driving wheel thus making two revolutions to one of the pedal crank axle. The bracket should be made of cast steel or malleable iron. The stay rods L L are in two parts and each rod is joined together by a screw-coupling M M. One end of the rods is bolted to the frame or fork C C and the other end to the snugs S S on the bracket.

By means of the screw couplings M M the stay rods can be readily lengthened or shortened a little either way or on either side, so that by this means the distance between the centers of the two crank axles can be exactly adjusted as the frame or fork C C is pivoted at the top and free to move.

The carrier spindle N, Fig. 3, is shown hollow to hold a supply of oil. A small hole is drilled in the middle of it, on the under side through which oil runs out to lubricate the carrier. In place of this a solid spindle may be used if preferred.

In the accompanying drawings plain bearings are shown for the driving gear. These should be of steel and hardened. Ball bearings may be used if preferred. The manner of fitting these is well understood by competent persons.

By the use of single cranks on the outside of the bracket bearings the gear can be arranged within the bracket and is thus self contained.

It is obvious that the driving gear can thus be made and sold separately apart from the bicycle of this construction, as by means of the adjustable connection on the top of the bracket it can be readily connected and adjusted.

By the use of my improvements herein described and illustrated by the accompanying drawings, I am enabled to dispense with chain driving gear and its adjustments, and as by this arrangement any proportion of spur gear may be used, so any desired speed usual in velocipedes can be attained.

Having now particularly described and ascertained the nature of my said invention and in what manner the same is to be performed, I declare that what I claim is—

In combination with a bicycle, a bifurcated bracket detachably secured to the frame thereof, main and supplemental crank shafts journaled therein extending through the walls of the bracket and provided with cranks upon their ends, gear wheels mounted upon said shafts within the bifurcated portion an idler gear meshing with said wheels, driving rods connecting the cranks of the supplemental shaft with cranks on the rear axle, and adjustable brace rods connecting the bracket with the frame of the bicycle, substantially as described.

In witness whereof I have hereunto signed my name in the presence of two subscribing witnesses.

WILLIAM DEVOLL.

Witnesses:
JOHN JAMES RAGGETT,
HENRY ARCHER PURCHASE.